United States Patent [19]

Bohen et al.

[11] Patent Number: 4,938,894

[45] Date of Patent: Jul. 3, 1990

[54] TETRAHALOPHTHALATE ESTERS AS FLAME RETARDANTS FOR ABS (ACRYLONITRILE-BUTADIENE STYRENE TERPOLYMER) RESINS

[75] Inventors: Joseph M. Bohen, King of Prussia; Ronald F. Lovenguth, Doylestown, both of Pa.

[73] Assignee: Pennwalt Corporation, Philadelphia, Pa.

[21] Appl. No.: 115,688

[22] Filed: Oct. 30, 1987

[51] Int. Cl.$^5$ .................. C09K 21/00; C08K 5/20; C08K 5/09; C08K 5/12

[52] U.S. Cl. .................. 252/609; 252/601; 524/217; 524/219; 524/288; 524/295; 524/296

[58] Field of Search ............ 524/217, 220, 219, 221, 524/288, 94, 290, 296, 295; 264/120, 126, 127; 252/601, 609, 606

[56] References Cited

U.S. PATENT DOCUMENTS

| | | | |
|---|---|---|---|
| 2,946,852 | 2/1950 | Bohrer | 260/31.8 |
| 3,766,249 | 10/1973 | Howell et al. | 260/476 R |
| 3,772,342 | 11/1973 | Foley | 260/475 R |
| 3,775,165 | 11/1973 | Young et al. | 117/136 |
| 3,947,421 | 3/1976 | Seydl | 260/40 R |
| 3,966,676 | 6/1976 | Richter et al. | 260/45.75 B |
| 4,024,102 | 5/1977 | Stackman et al. | 260/40 R |
| 4,032,481 | 6/1977 | Pillar | 260/2.5 FP |
| 4,094,850 | 6/1978 | Morgan et al. | 524/288 |
| 4,098,704 | 7/1978 | Sandler | 252/8.6 |
| 4,104,073 | 8/1978 | Koide et al. | 252/606 |
| 4,107,231 | 8/1978 | Wurmb et al. | 260/873 |
| 4,132,748 | 1/1979 | Arthur et al. | 524/409 |
| 4,295,886 | 10/1981 | Gresham | 106/18.19 |
| 4,298,517 | 11/1981 | Sandler | 524/290 |
| 4,361,666 | 11/1982 | Defour | 524/295 |
| 4,376,837 | 3/1983 | Jenkner et al. | 524/288 |
| 4,397,977 | 8/1983 | Sandler | 524/288 |
| 4,404,361 | 9/1983 | Barda | 524/94 |
| 4,743,637 | 5/1988 | Axelrod et al. | 524/94 |
| 4,762,861 | 8/1988 | Bohen et al. | 521/97 |
| 4,764,550 | 8/1988 | Lovenguth | 524/288 |

FOREIGN PATENT DOCUMENTS 47-47981 12/1972 Japan.
53-120755 10/1978 Japan.
87/01713 3/1987 PCT Int'l Appl..

OTHER PUBLICATIONS

M. Bhatnager, "Fire Retardants: Proceedings of 1974 International Symposium of Flammability and Fire Retardants", May 1-2, 1974, Technomic Pub. Co., pp. 162-179.

Primary Examiner—Howard J. Locker
Attorney, Agent, or Firm—Bernard F. Plantz

[57] ABSTRACT

Tetrahalophthalate esters are disclosed herein as flame retardant processing aids for ABS (acrylonitrile-butadienestyrene terpolymer) resins.

16 Claims, No Drawings

TETRAHALOPHTHALATE ESTERS AS FLAME RETARDANTS FOR ABS (ACRYLONITRILE-BUTADIENE STYRENE TERPOLYMER) RESINS

BACKGROUND OF THE INVENTION

This invention relates to flame retardant compositions containing at least one tetrahalophthalate ester and an ABS resin. Additionally this composition may also contain one or more brominated and/or chlorinated compounds in an amount to provide additional flame retardancy to the ABS resin. This invention also comprehends the method of improving the flame retardancy and processability of the ABS resins by using these tetrahalophthalate esters along or in combination with one or more bromine and/or chlorine compounds.

ABS resins are known in the art as a class of thermoplastics which are characterized by excellent properties such as chemical resistance, abuse resistance, stain resistance, etc. A discussion of typical properties of ABS resins are described on pages 1-64, 1-66, and 1-68 of Charles A. Harper's "Handbook of Plastics and Elastomers" which is published by McGraw-Hill Book Company in 1975. These pages are hereby incorporated by reference. ABS resins are terpolymers which are, in general, derived from acrylonitrile, styrene, and butadiene. Most are true graft polymers in which acrylonitrile and styrene are grafted onto a polybutadiene or rubber phase which may further be dispersed in a rigid styrene-acrylontrile (SAN) matrix. Other ABS resins are mechanical polyblends of elastomeric and rigid copolymer, e.g. butadiene-acrylonitrile rubber and SAN. (See. G. C. Hawkins, "Condensed Chemical Dictionary", 10th Edition, p. 3, 1981 as well as U.S. Pat. Nos. 4,107,232; 4,206,290; 4,487,886; 4,567,218; and 4,579,906 all of which are incorporated herein by reference. Hawkins, supra, defines ABS resin as: "Any group of touch, rigid thermoplastics deriving their name from the three letters of the monomers which produce them; Acrylonitrile-Butadiene-Styrene. Most contemporary ABS resins are true graft polymers consisting of an elastomeric polybutadiene or rubber phase, grafted with styrene and acrylonitrile monomers for compatibility, dispersed in a rigid styrene-acrylonitrile (SAN) matrix. Mechanical polyblends of elastomeric and rigid copolymers, e.g., butadiene-acrylonitrile rubber and SAN, historically the first ABS resins, are also marketed.

Varying the composition of the polymer by changing the ratios of the three monomers and use of other comonomers and additives results in ABS resins with a wide range of properties.

The general chemical structure of ABS is

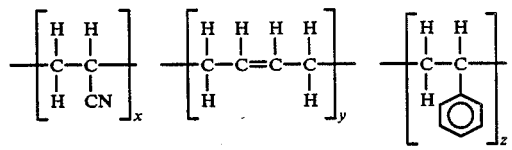

wherein x, y, and z may independently vary from about 10 to about 1,500. (See U.S. Pat. No. 4,567,218, the teachings of which are incorporated herein by reference.) It should be understood that analogs of each of the monomeric components above may be substituted in whole or in part, and is within the definition of ABS resin. For example, α-methylstyrene may be substituted for styrene and methacrylonitrile for acrylonitrile. Descriptions of the compositions of various ABS resins and how they are prepared may be found in U.S. Pat. Nos. 2,505,349; 2,550,139; 2,698,313; 2,713,566; 2,820,773; 2,908,661; 4,107,232; 4,173,561; 4,200,702; 4,206,290; 4,289,687; 4,355,126; 4,379,440; 4,456,721; 4,487,886; and 4,581,403, the teachings of which are incorporated herein by reference.

The ABS resins are useful in many commercial applications such as automotive, business machines, telephone, etc., where high impact strength is required as well as in the production of molded articles.

The use of brominated and/or chlorinated compounds by themselves or in combination with other materials such as organic phosphates, boron compounds, etc. as flame retardants for ABS resin compositions are well known in the art and are exemplified by U.S. Pat. Nos. 4,051,101; 4,051,105; 4,096,206; 4,107,122; 4,107,232; 4,173,561; 4,200,702; 4,289,687; 4,579,906; 4,355,126; 4,378,440; 4,567,218; 4,581,403; 4,581,409; and 4,600,747. The aforesaid patents are incorporated herein by reference.

Tetrahalophthalate esters have been used as flame-proofing materials. For example, U.S. Pat. No. 4,098,704 describes the use of these materials as textile finishing agents. U.S. Pat. Nos. 4,298,517 and 4,397,977 disclose these compounds as flame retardants for halogenated resins. However, no teachings have been found which show these compounds as flame retardants or processing aids for ABS resins.

SUMMARY OF THE INVENTION

The invention is defined as a flame retardant plastic composition comprising (i) an ABS terpolymer resin; and
(ii) a flame retarding effective amount incorporated in the resin of (i) of a tetrahalophthalate ester flame retardant processing aid of the formula:

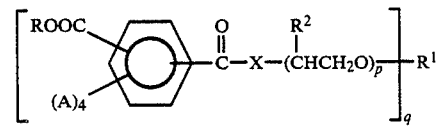

wherein:
(a) the ring can have all possible isomeric arrangements;
(b) R is selected from the group consisting of hydrogen, an alkyl or substituted alkyl or 1 to 30 carbons, hydroxyalkyl of 2 to 20 carbons, polyhydroxyalkyl of 3 to 10 carbons, and

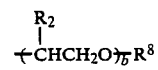

where $R^8$ is an alkyl or substituted alkyl of 1 to 18 carbons, and b is 1 to 50;
(c) $R^1$ is selected from the group consisting of hydrogen, an alkyl or substituted alkyl of 1 to 30 carbons, alkenyl or substituted alkenyl of 2 to 22 carbons,

where $R^7$ is an alkyl of 1 to 18 carbons; a polyhydroxyalkyl of 3 to 12 carbons;

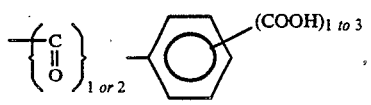

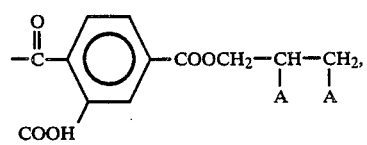

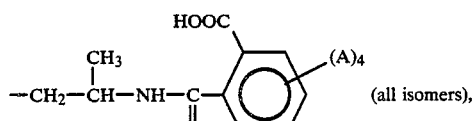

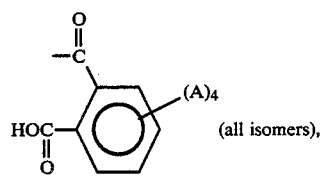

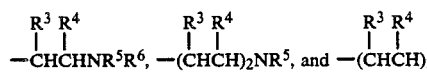

(d) $R^2$ is independently selected from the class consisting of H and $CH_3—$;
(e) $R^3$, $R^4$, $R^5$, and $R^6$ are independently selected from the class consisting of H and an alkyl of 1 to 18 carbons;
(f) p is an integer of 0 to 50;
(g) q is an integer of 1 to 6;
(h) X is selected from O or NH; and
(i) A is selected from Cl or Br.

Preferably, the weight ratio of (i) to (ii) is within the range of about 100:1 to about 2:1.

In the above ABS resin, a portion or all of acrylic and styrenic monomers comprising the resin include methacrylonitrile or α-methylstyrene, or methacrylonitrile and α-methylstyrene.

It is preferred that in the above tetrahalophthalate ester (ii), R is an alkyl or substituted alkyl or 1 to 10 carbons, A is Br, X is oxygen, p is 0 to 20, and q is 1 to 6. More preferably R is

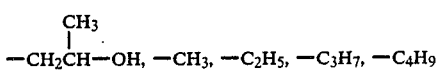

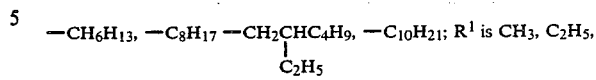

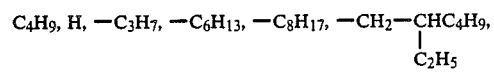

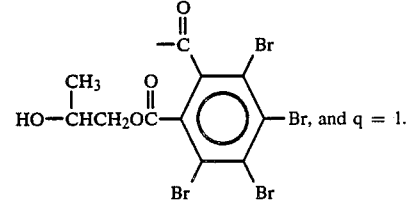

The above composition can also contain other brominated and/or chlorinated flame retardants known in the art.

The preferred ABS resin is comprised of monomeric units of a vinyl aromatic monomer, a vinyl nitrile monomer, and a butadiene monomer and the number of units of each monomer is independently within the range of from about 10 to about 1500.

The invention also comprehends a method for preparing a flame retardant plastic composition having enhanced processability properties which comprises incorporating a flame retarding effective amount of the tetrahalophthalate ester of ii above in the ABS resin of i above.

Another aspect of this invention is that the composition may optionally also contain other bromine and/or chlorine compounds such as those that are well known in the art.

This invention also comprehends the method of improving the flame retardancy, processability, and physical properties such as impact strength of the ABS resins by incorporating in the resin the tetrahalophthalate compound as described above alone or in combination with other bromine and/or chlorinated flame retardants.

ABS is sold on the basis of its impact properties. Unfortunately, when this material has to be flame retarded with conventional retardants to meet code requirements, there is a significant loss of impact strength.

Representative tetrahalophthalate compounds useful in practicing this invention are as follows (where A is Br or Cl):

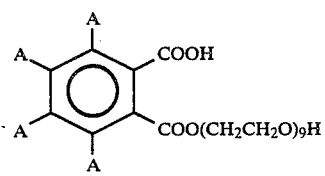

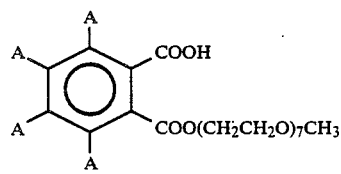

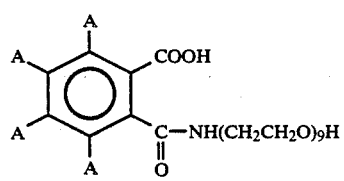
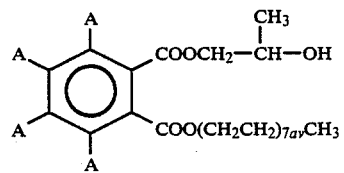
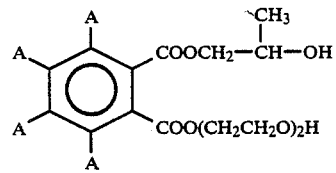
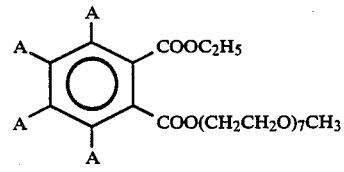
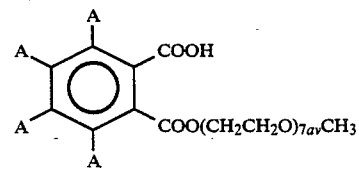
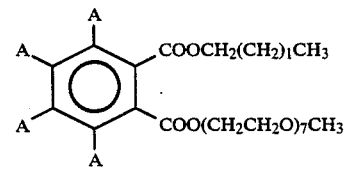
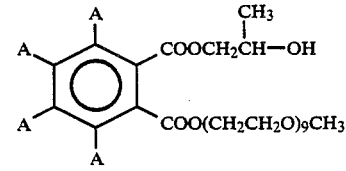
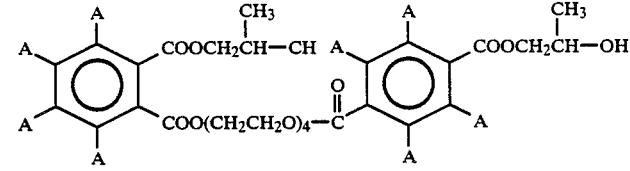
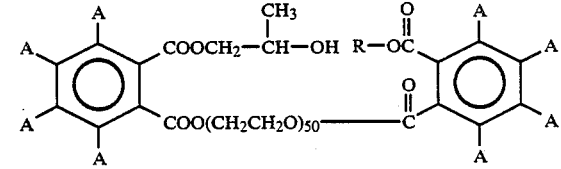
-continued
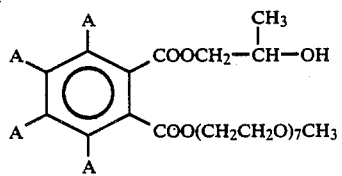
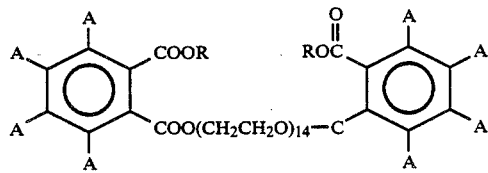
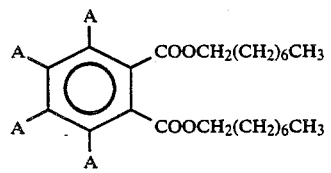
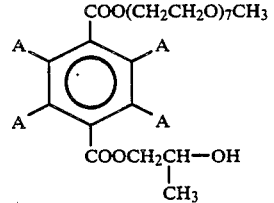
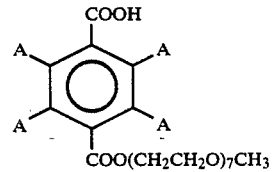
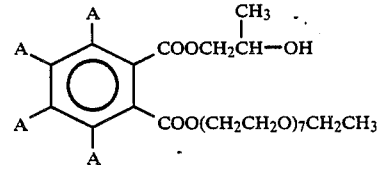
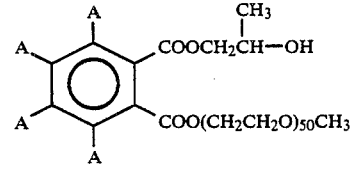

-continued
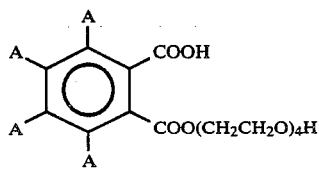 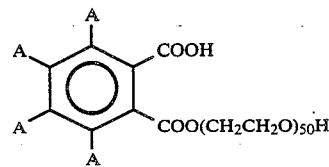
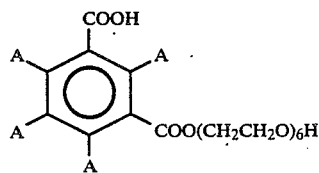 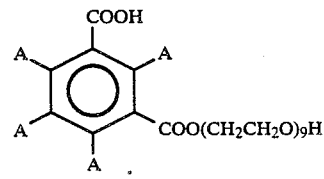
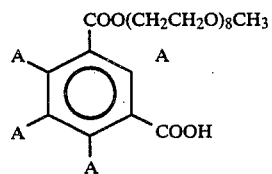 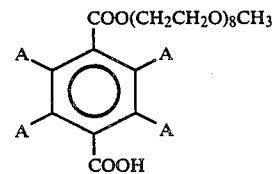
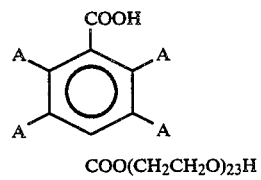 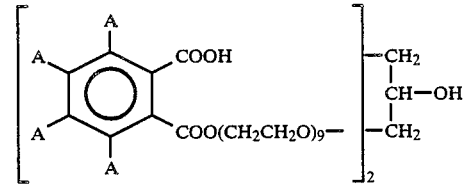
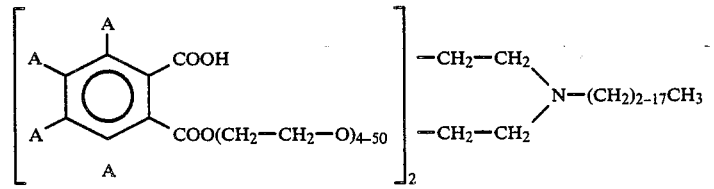
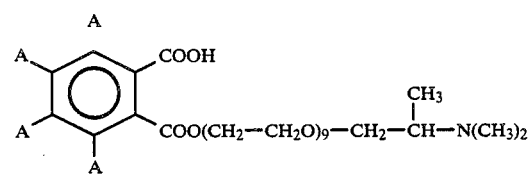
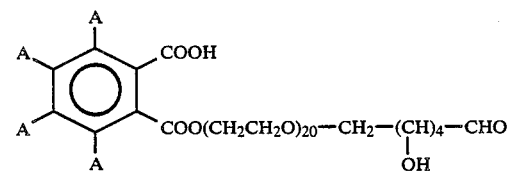
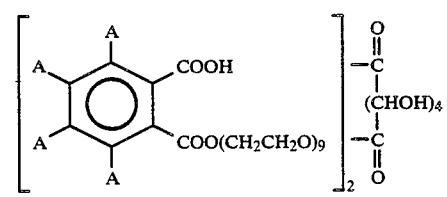

-continued
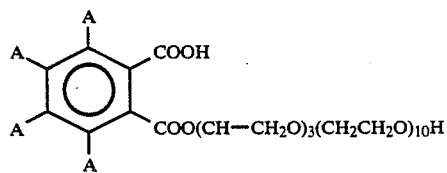
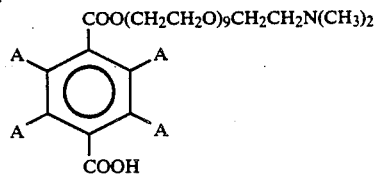
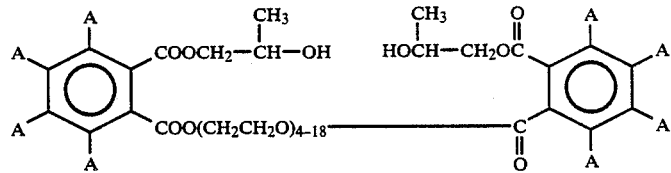
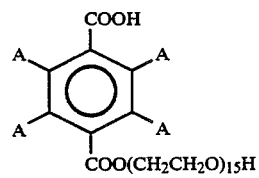
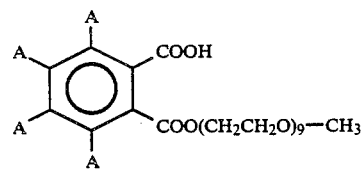
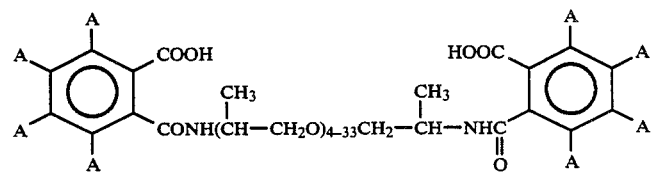
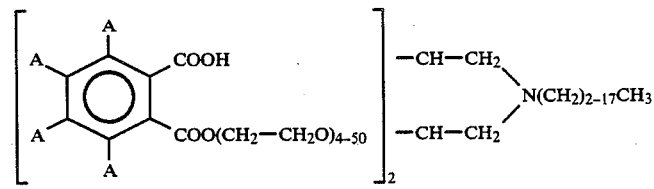
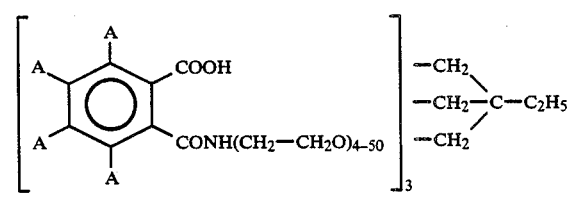
The preferred compounds are:
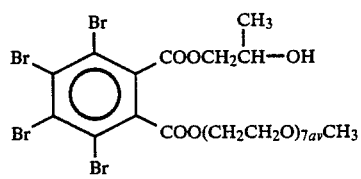
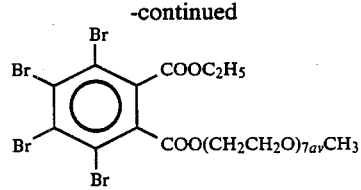
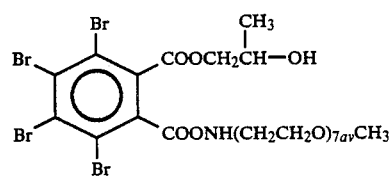
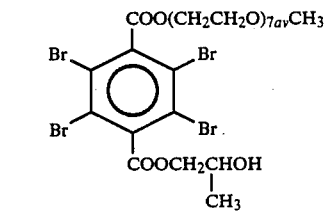

-continued
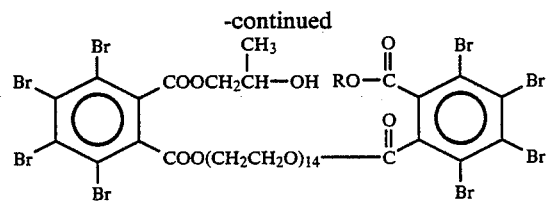
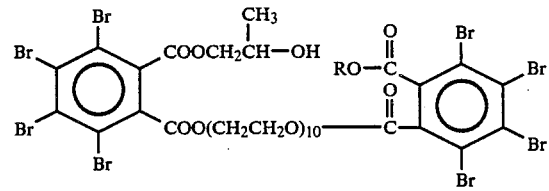
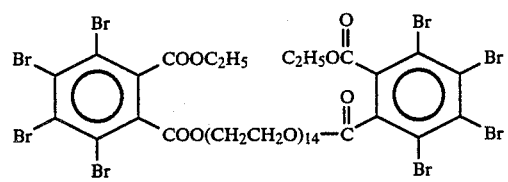
-continued
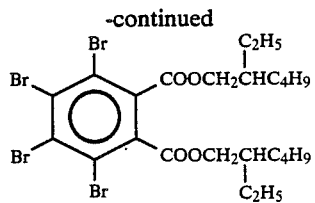
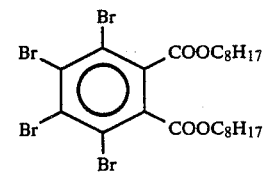
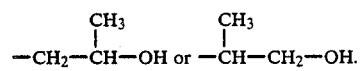
The R in the above formulas is
$$-CH_2-\underset{CH_3}{\overset{|}{C}H}-OH \text{ or } -\underset{CH_3}{\overset{|}{C}H}-CH_2-OH.$$
The brominated and/or chlorinated compounds that may be used in combination with the tetrahalophthalates are any of those that are well known in the art. Preferred halogenated flame retardant examples are
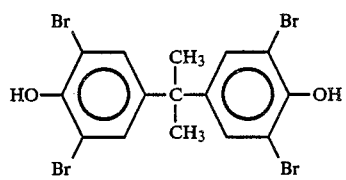
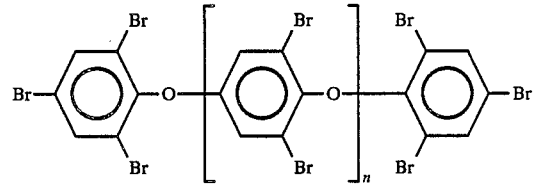
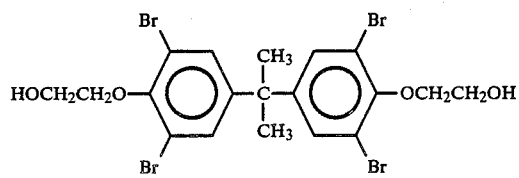
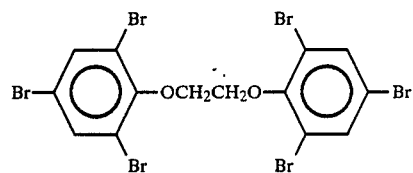
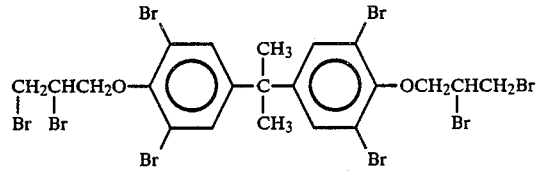
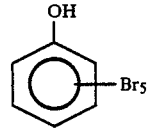
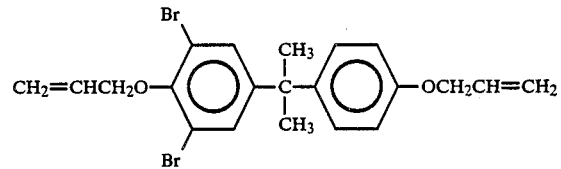
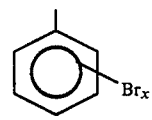
(x = 4 to 6)
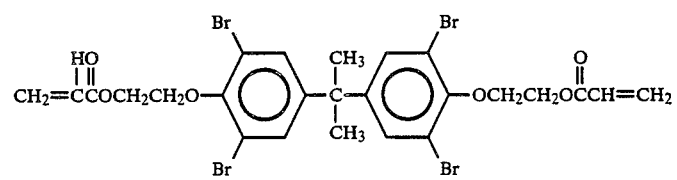
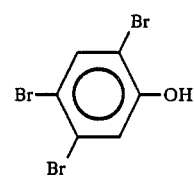

-continued

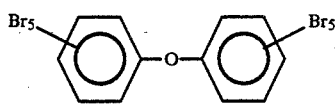
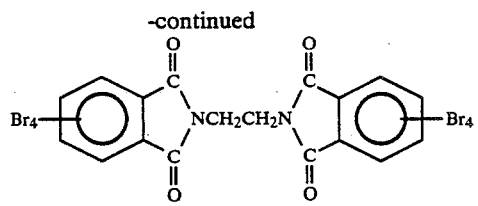

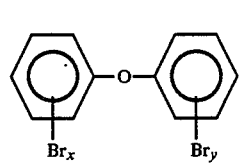
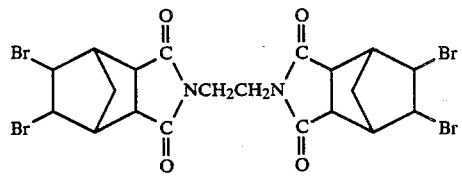

(x + y = 5-8)

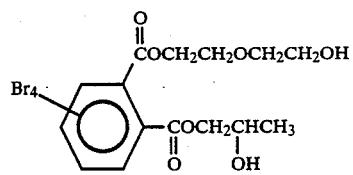
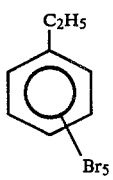

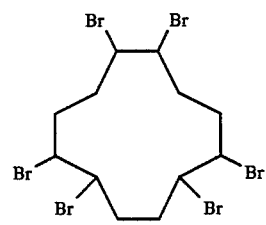
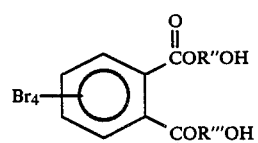
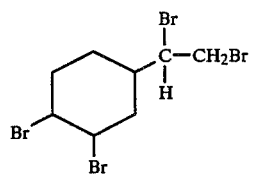

where R″ and R‴ are
alkylene or substituted alkylene

In practicing this invention, the tetrahalophthalate by itself or additionally with other brominated and/or chlorinated flame retardants is added to the ABS resin in any convenient manner, such as blending or extruding in order to get a uniform composition. Flame retardant synergists such as antimony oxide ($Sb_2O_3$) may also be added if desired. In addition, other additives such as thermal stabilizers, ultraviolet stabilizers, reinforcing agents, organic polymers, mold release agents, blowing agents, colorants, and the like may also be optionally included. A further advantage of the tetrahalophthalates alone or in combination with other brominated and/or chlorinated compounds as used in this invention is their improved compatibility with ABS resins.

The ABS resins that may be used in this invention are, in general, derived from acrylonitrile, styrene, and butadiene and have the following general structure:

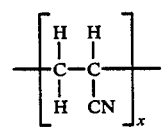
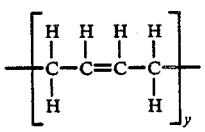

acrylonitrile    butadiene

-continued

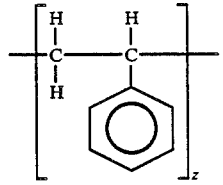

styrene wherein x, y and z may independently vary from about 10 to about 1,500. It is understood that analogs of each of the components above that comprise the ABS resins may be substituted in whole or in part.

The ratio of tetrahalophthalate or a mixture of tetrahalophthalate and one or more brominated and/or chlorinated compounds to ABS resins that will impart flame retardancy to the latter may vary from 1:100 to about 1:2 depending on the application. In addition, the ratio of tetrahalophthalate to other brominated and/or chlorinated compounds may vary from 100:0 to about 1:99.

The compositions of this invention may also include other additives such as thermal stabilizers, ultraviolet stabilizers, reinforcing agents, organic polymers, mold release agents, blowing agents, colorants, etc.

In order to illustrate the present invention, the following examples are presented. These are not to be construed as limiting the scope of the invention.

EXAMPLE 1

To 1,392 g (3.0 moles) of tetrabromophthalic anhydride were added 1,050 g (3.0 moles) of Methoxy Carbowax 350 in the presence of 22.0 g of sodium acetate. The mixture was heated at 90° C. for 8 hours in a nitrogen atmosphere. The reaction mixture was filtered hot to remove the sodium acetate. The analytical data were consistent with the assigned structure.

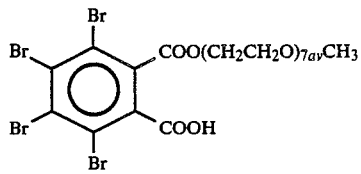

EXAMPLE 2

To the compound of Example 1 were added 348.0 g (6.0 moles) of propylene oxide and 2.0 liters of toluene. The mixture was heated at 60°–100° C. The solvent and residual propylene oxide were removed to give the product in almost quantitative yield. The analytical data were consistent with the assigned structure:

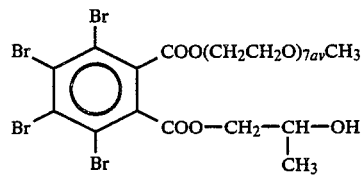

EXAMPLE 3

To 92.8 g (0.2 mole) of tetrabromophthalic anhydride is added all at once 80 g (0.2 mole) of Carbowax 400 and the mixture heated to 120°–130° C. for 2.5 hours. The desired product is isolated in essentially quantitative yield as a clear yellow viscous liquid. Calcd. Mol. Wt., 864; found 865. Calcd. % Br, 371; found, 38.5. The analytical data are consistent with the assigned structure:

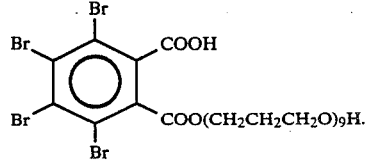

EXAMPLE 4 to 240 g (0.24 mole) of the compound of Example 3 is added 45.3 g (0.24 mole) of trimetellitic anhydride and heated at 155° C. under nitrogen for about 7 hours. The infrared spectrum indicated the completion of the reaction by the substantial disappearance of the anhydride absorption band at 5.65. The product was isolated in essentially quantitative yield. Analy. Calcd.; %Br, 30.3%; Mol. Wt. 1056; neutralization equivalent, 352, Found: %Br, 29.4; Mol. Wt., 1014; neutralization equivalent, 351. The spectrum data was consistent with the structure:

Br—C₆Br₃(COOH)—COO(CH₂CH₂CH₂O)₉—C(=O)—C₆H₃(COOH)—COOH

EXAMPLE 5

To 156.3 g (0.18 mole) of the compound of Example 3 is added 70.9 g (0.18 mole) 2,2-dibromopropyl trimellitate. The mixture is heated at 130°–140° C. for 6 hours with stirring to give the product as a brown opaque oil. Isolation afforded the product in essentially quantitative yield and the analysis is consistent with the structure being:

Br—C₆Br₃(COOH)—COO(CH₂CH₂CH₂O)₉—C(=O)—C₆H₃(COOH)—COOCH₂CH(Br)—CH₂Br (and isomers)

EXAMPLES 6 TO 11

The following preparation were carried out as in Example 1 using the reactant set forth below).

| Example No. | Tetrabromophthalic Anhydride | Hydroxy Compound | Product Structure |
|---|---|---|---|
| 6 | 1.0 mole | HOCH₂CH₂OCH₂CH₂OH 1.0 mole | Br₄C₆(COOH)COO(CH₂CH₂O)₂H |

-continued

| Example No. | Tetrabromophthalic Anhydride | Hydroxy Compound | Product Structure |
|---|---|---|---|
| 7 | 1.0 mole | HO(CH$_2$CH$_2$O)$_4$H (Carbowax 200) 1.0 mole | Br-substituted benzene with COOH and COO(CH$_2$CH$_2$O)$_4$H |
| 8 | 1.0 mole | HO(CH$_2$CH$_2$O)$_{13}$H (Carbowax 600) 1.0 mole | Br-substituted benzene with COOH and COO(CH$_2$CH$_2$O)$_{13}$H |
| 9 | 1.0 mole | HO(CH$_2$CH$_2$O)$_{23}$H (Carbowax 1000) 1.0 mole | Br-substituted benzene with COOH and COO(CH$_2$CH$_2$O)$_{23}$H |
| 10 | 1.0 mole | HO(CH$_2$CH$_2$O)$_{45}$H (Polyglycol E-2000) 1.0 mole | Br-substituted benzene with COOH and COO(CH$_2$CH$_2$O)$_{45}$H |
| 11 | 2.0 mole | HO(CH$_2$CH$_2$O)$_9$H (Carbowax 400) 1.0 mole | Two Br-substituted benzenes linked via COO(CH$_2$CH$_2$O)$_9$C(=O) bridge, each with COOH |

EXAMPLE 12

To 96.4 g (0.2 mole) of tetrabromoterephthalic acid is added all at once 160 g (0.2 mole) of Carbowax 400 and 300 g toluene containing 1.0 g P-toluene sulfonic acid. The mixture is heated to reflux until 3.6 g (0.2 mole) water was collected. The toluene is removed under reduced pressure to give a clear viscous liquid in essentially quantitative yield.

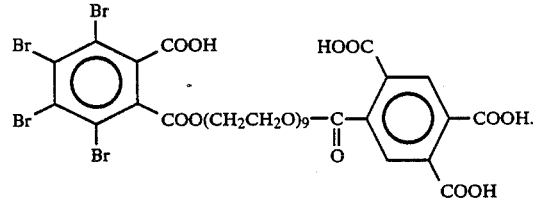

EXAMPLE 13 to 86.4 g (0.1 mole) of the compound of Example 3 is added all at once 21.8 g(0.1 mole) pyromellitic dianhydride and the mixture heated to 120°–130° C. for 2.5 hours to give the desired product. Water, 1.8 g (0.1 mole), is added to open the remaining anhydride group and the analytical data are consistent with the assigned structure:

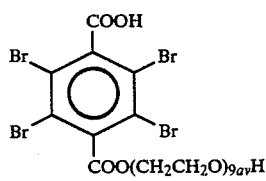

EXAMPLE 14

To 86.4 g (0.1 mole) of the compound of Example 3 is added all at once 10.0 g (00.05 mole) of pyromellitic dianhydride and the mixture heated to 120°–130° C. for 2.5 hours to give the desired product. The analytical data are consistent with the assigned structure:

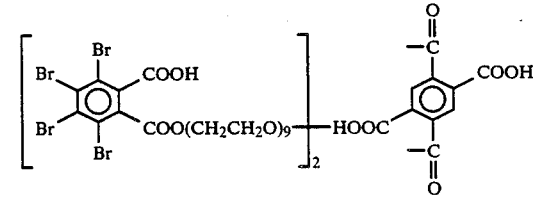

EXAMPLE 15

To 86.4 g (0.1 mole) of the compound of Example 3 is added all at once 21.8 g (0.1 mole) of phthalic anhydride and the mixture heated to 120°–130° C. for 2.5 hours to give the desired product. The analytical data are consistent with the assigned structure:

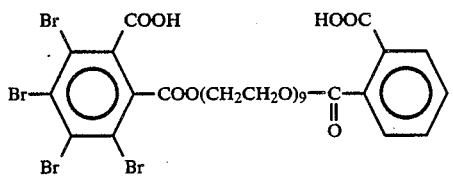

EXAMPLE 16 to 139.2 g (0.3 mole) of tetrabromophthalic anhydride is added all at once 122.9 g (0.1 mol) polyoxyethylated trimethylol propane of molecular weight 1229 and the mixture heated to 120°–130° C. for 2.5 hours to give the desired product. The analytical data are consistent with the assigned structure:

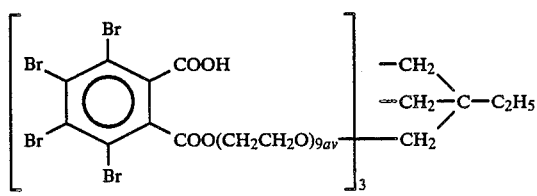

EXAMPLE 17

To 139.2 g (0.3 mole) of tetrabromophthalic anhydride is added all at once 156.8 g (0.1 mol) polyoxypropylated trimethylol propane of molecular weight 1568 and the mixture heated to 120°–130° C. for 2.5 hours to give the desired product. The analytical data are consistent with the assigned structure:

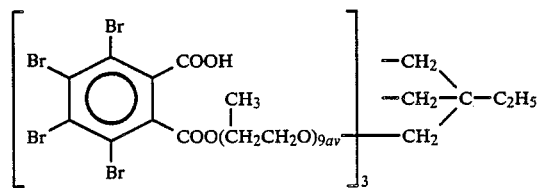

EXAMPLE 18

To 284.0 g (1.0 mole) of tetrachlorophthalic anhydride is added 350.0 g (1.0 mole) of Methoxy Carbowax 350 in presence of 7.0 g of sodium acetate. The mixture is heated at 90° C. for 8 hours in a nitrogen atmosphere. The reaction mixture is filtered hot to remove sodium acetate to give the expected product in nearly quantitative yield. The analytical data are consistent with the assigned structure:

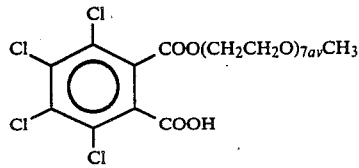

EXAMPLE 19

To 634.0 g (1.0 mole) of the composition of Example 18 is added 116 g (2.0 mole) of propylene oxide in 200 ml of toluene. The reaction mixture is heated from 60°–100° C. for 3–5 hours, and then concentrated to give the product in nearly quantitative yield. The analytical data are consistent with the assigned structure:

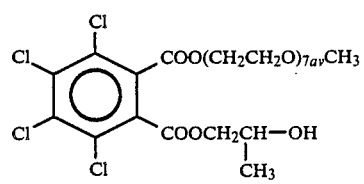

EXAMPLE 20 to 284.0 g (1.0 mole) of tetrachlorophthalic anhydride is added 200.0 g (1.0 mol) of Carbowax 200 in the presence of 7.0 g of sodium acetate. The mixture is heated at 90° C. for 8 hours in a nitrogen atmosphere. The reaction mixture is filtered hot to remove sodium acetate to generate the expected product in nearly quantitative yield. The analytical data are consistent with the assigned structure:

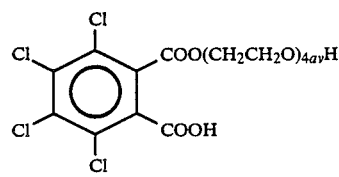

EXAMPLE 21

To 484.0 g (1.0 mol) of the product of Example 21 is added 116.0 g (2.0 mole) of propylene oxide in 200 ml of toluene. The reaction mixture is warned at 60°–100° C. for 3–5 hours, and then concentrated to give the product in nearly quantitative yield. The analytical data are consistent with the assigned structure:

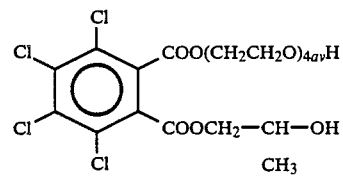

EXAMPLE 22

To 284.0 g (1.0 mole) of tetrachlorophthalic anhydride is added 400.0 g (1.0 mole) of Carbowax 400 in the presence of 7.0 of sodium acetate. The mixture is heated at 90° C for 8 hours in a nitrogen atmosphere. The reaction mixture is filtered hot to remove sodium acetate to generate the expected product in nearly quantitative yield. The analytical data are consistent with the assigned structure:

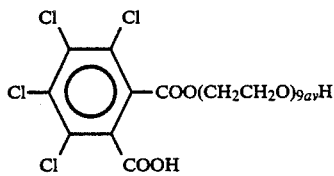

EXAMPLE 23

To 46.4 g (0.1 mole) of tetrabromophthalic anhydride is added all at once 44.1 g (0.1 mole) of polyoxyethylated dimethylamine [CH$_3$)$_2$n(CH$_2$CH$_2$O)$_9$H] dissolved in 100 ml of toluene. The mixture was heated at 100°–110° C. for 4–5 hours and then concentrated to give the desired product in essentially quantitative yield. The analytical data are consistent with the assigned structure:

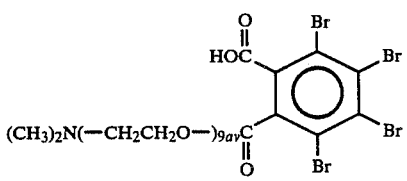

EXAMPLE 24

To 92.8 g (0.2 mole) of tetrabromophthalic anhydride is added 80.0 g (0.2 mol) of

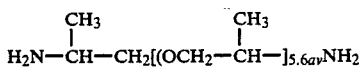

(Jeffamine D-400) and the mixture heated to about 120° C. The final product is obtained in almost quantitative yield. The analytical data are consistent with the assigned structure:

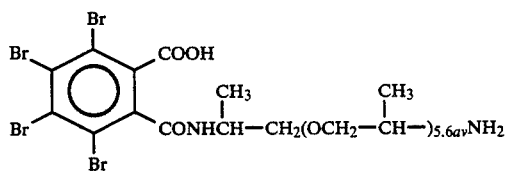

EXAMPLE 25

Poly(ethylene glycol; 300), 204.5 g (0.67 mole) was refluxed (T=117° C.) with 600 ml of toluene for 1.5 hours in order to remove a small amount of water present in the glycol. The mixture was cooled to about 100° C. and tetrabromophthalic anhydride, 614.5 g (1.35 moles) and sodium acetate, 1.62 g were added and the mixture was reheated to reflux and held for 25 hours. After the mixture was cooled to 50° C., propylene oxide, (156.4 g, 2,69 moles, 100% excess) was added and the mixture heated to and held at 100° C. for 2.5 hours. When the solution cooled to about 50° C. it was filtered through a bed or diatomaceus earth and decolorizing charcoal. The filtrate was distilled to remove the solvent to give 904.1 g of product as a viscous liquid. Calcd. % Br, 47.4, Found % Br, 46.5. Analytical data is consistent with the assigned structure.

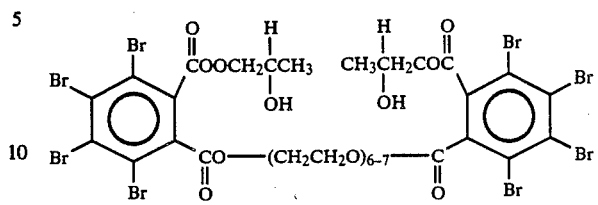

EXAMPLE 26

This compound was prepared by the procedure described in Example 25 except that poly(ethylene glycol 200) was used in place of poly(ethylene 300). Product is viscous liquid. Calcd. % Br, 51.0. Found % Br, 49.3. Analytical data was consistent with the assigned structure:

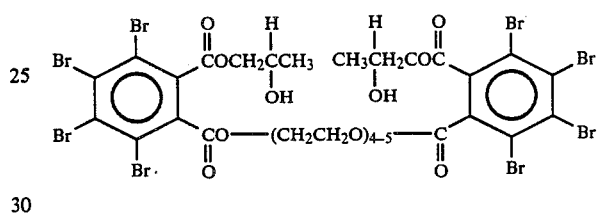

EXAMPLE 27

This compound was prepared by the procedure described in Example 25 except that poly(ethylene glycol 600) was used in place of poly(ethylene glycol 300). Product is a viscous liquid. Calcd. % Br, 39.5. Found % Br, 39.3. Analytical data is consistent with the assigned structure:

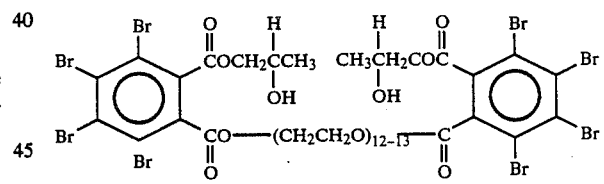

EXAMPLE 28

This compound was prepared by the procedure described in Example 25 except that poly(ethylene glycol 400) was used in place of poly(ethylene glycol 300). Product is a viscous liquid. Calcd. % Br, 44.2. found % Br, 44.0. Analytical data is consistent with the assigned structure:

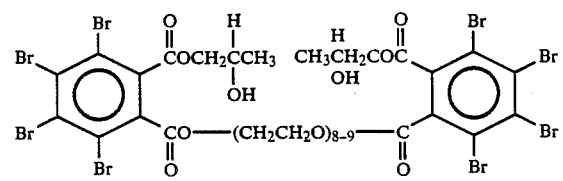

EXAMPLE 29

Methanol (54.1 g, 1.5 mole), tetrabromophthalic anhydride (696.6 g, 1.6 moles), and potassium acetate, 2.73 g were refluxed for 4 hours with 500 ml of toluene. After cooling the reaction mixture to room temperature, propylene oxide (87.12 g, 1.5 moles) were added and the mixture reacted at 80° C. for 2.5 hours. Product was obtained as a viscous liquid after distilling out the toluene. Calcd. % Br, 57.7. Found % Br, 57.2. Analytical data is consistent with assigned structure.

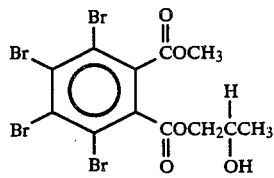

EXAMPLE 30

This compound was prepared by the procedure similar to that described in Example 29 except that methoxycarbowax 350 was used in place of methanol and ethylene oxide in place of propylene oxide. Calcd. % Br, 37.8. Found % Br, 37.2. Analytical data is consistent with assigned structure.

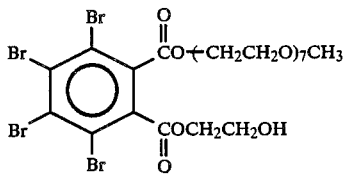

EXAMPLE 31

This compound was prepared by the procedure in Example 29 except that 2-methoxyethanol is used in place of methanol. Product is viscous liquid. Calcd. % Br, 53.6. Found % Br, 52.0. Analytical data is consistent with the assigned structure.

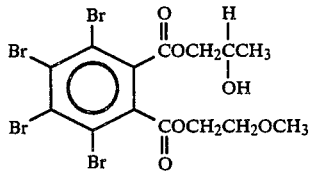

EXAMPLE 32

This compound was prepared by the procedure outlined in Example 29 except that methoxycarbowax 350 was used in place of methanol and epoxybutane in place of propylene oxide. Product is a viscous liquid. Calcd. % Br, 36.5. Found % Br, 37.2. Analytical data is consistent with the assigned structure.

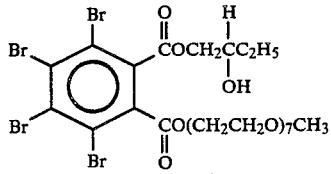

EXAMPLE 33

This compound was prepared by the procedure outlined in Example 29 except that 2-ethylhexanol-1 was used in place of methanol. Product is a viscous liquid. Calcd. % Br, 50.0. Found % 52.7. Analytical data is consistent with the assigned structure.

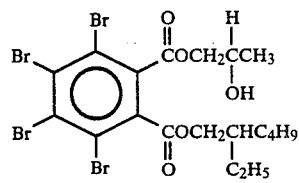

EXAMPLE 34

This compound was prepared by the procedure described in Example 29 except that stearyl alcohol was used in place of methanol. Product is a viscous liquid. Calcd. % Br, 41.0. Found % Br, 43.0. Analytical data is consistent with the assigned structure.

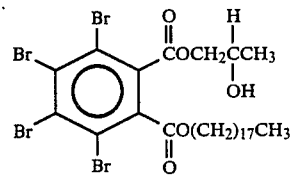

EXAMPLE 35

This compound was prepared by the procedure described in Example 29 except that 2,3-dibromopropanol-1 was used in place of methanol. Product is a viscous liquid. Calcd. % Br, 64.8. Found % Br, 61.9. Analytical data is consistent with the assigned structure.

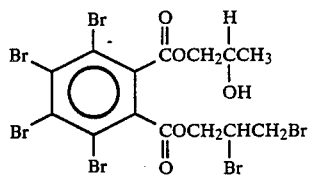

EXAMPLE 36

This compound was prepared by the procedure outlined in Example 29 except that epichlorohydrin was used in place of propylene oxide. Calcd. % Br, 35.7. Found % 35.4. Analytical data is consistent with the assigned structure.

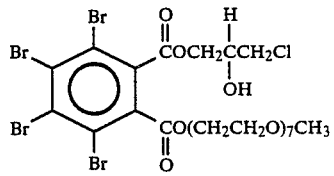

EXAMPLE 37

To a solution of methoxycarbowax 350 (300.0 g, 0.89 mole) in dry toluene (184 ml) was added sodium methoxide (48.0 g, 0.90 mole) in methanol. The methanol was then distilled off atmospherically. Tetrabromophthalic anhydride was then added (442.2 g, 0.89 mole) along with an additional 50 ml of toluene. The reaction mixture was refluxed for 2 hours and after cooling to room temperature, epichlorohydrin (106.94 g, 1.16 moles) was added. The mixture was refluxed for 20 hours. After the solvent and excess epichlorohydrin were distilled, a viscous dark product was obtained. Calcd. % Br, 37.2. Found % Br, 40.4. Analytical data is consistent with assigned structure.

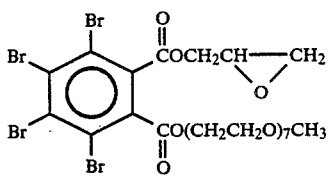

EXAMPLE 38

Methoxycarbowax 350 and toluene were refluxed for 1 hour in order to distill out a small amount of water. Tetrabromophthalic anhydride (1:1 mole ratio with methoxycarbowax 350) and sodium acetate were added and the mixture refluxed for 17 hours. After cooling to room temperature, an excess of diazomethane (prepared from the decomposition of N-methyl-N-nitroso-p-toluene sulfonamide by sodium hydroxide) in ethyl ether was added and the mixture allowed to stand overnight. The excess diazomethane was decomposed by adding acetic acid and the solvent removed by distillation. Product is viscous liquid. Calcd. % Br, 39.2. Found % Br, 37.4. Analytical data is consistent with the assigned structure.

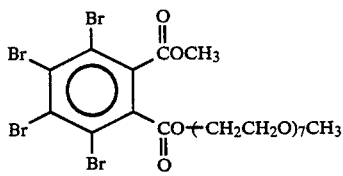

EXAMPLE 39

Di(2-ethylhexyl) tetrabromophthalate was prepared by the procedure described by Spatz et al. (I and EC Product Research and Development, Vol. 8, No. 4, 395 (1969).

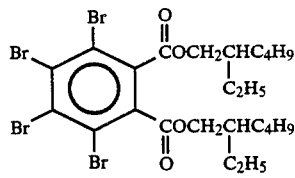

EXAMPLE 40

Poly(ethylene glycol 600) 88.4 g (1.40 moles), tetrabromophthalic anhydride, 1298.4 g (2.80 moles), potassium acetate, 1.35 g, and toluene (1000 g) were charged into a one-gallon glass-lined reactor and heated to 120° C. After 4 hours at this temperature, ethylene oxide, 246.68 g (5.60 moles) was pumped into the reactor in ¾ hour while maintaining the temperature at 120°.C. After one hour longer of heating, the mixture was cooled to room temperature, the excess ethylene oxide was then vented, and the product collected. After stripping off the toluene, 2250 g of the product was isolated in 99% yield as a viscous liquid. Calcd. % Br, 39.2. Found % Br, 38.8. Analytical data is consistent with the assigned structure.

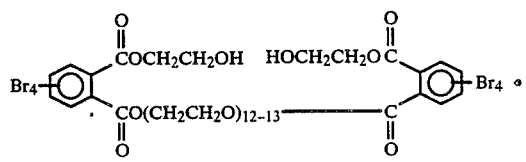

EXAMPLE 41

To the product of Example 3, 453.8 g (0.27 mole), acetic anhydride, 83.4 g (0.82 mole), potassium acetate, 1.0 g, and toluene, 400 ml, were refluxed for 8 hours. After cooling to room temperature, the reaction mixture was transferred to a separatory funnel and extracted first with 100 ml of a 16% potassium bicarbonate solution and then with 100 ml of water. After distilling off the solvent, 335.0 g (64% yield) of product was obtained as a viscous liquid. Calcd. % Br, 36.8. Found % Br, 32.9. Analytical data is consistent with the assigned structure.

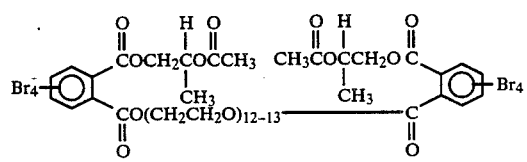

EXAMPLE 42

Tetrabromophthalic anhydride, 231.9 g (0.50 mole, 2-ethylhexanol, 130.2 g (1.0 mole), and potassium acetate, 0.24 g were heated to and kept at 120° C. for 4 hours. The mixture was cooled to 60° C. and potassium carbonate, 35.9 g (0.26 mole), was added. Reheated mixture to 80° C. and kept it at this temperature for 2 hours. Cooled mixture to 60° C. and added triethylamine, 14.2 g (0.14 mole). Reheated mixture to 70° C. and added methyl iodide, 113.6 g (0.8 mole) in 20 minutes. Heated mixture to 70–75° C. and kept it at this temperature for 2½ hours. Cooled mixture to room temperature and filtered it in order to remove by-product potassium iodide. The filtrate was distilled to remove toluene and 290 g of crude product was collected as a pale yellow liquid. Extracted this product with 3 times 100 ml of a 6.5% potassium carbonate solution followed by 2 times 100 ml of water and once with a 30% sodium chloride solution. Dried the organic phase over anhydrous magnesium sulfate overnight. Filtered off magnesium sulfate and after removing the solvent from filtrate by distillation, 204 g of product was obtained in 67% yield as a pale yellow liquid. Calcd. % Br, 52.6. Found % Br, 52.2. Analytical data is consistent with the assigned structure.

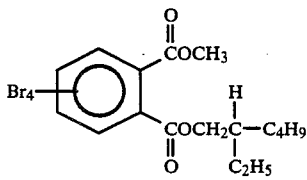

EXAMPLE 43

Tetrabromophthalic anhydride, 231.0 g (0.5 mole), 2-[2-methoxyethoxy]-ethanol, 360.5 g (3.0 moles), stannous oxalate, 2.32 g, and xylene, 200 ml, were refluxed (temp. 160° C.) for 18 hours during which time, theory water was collected. The xylene and excess 2-[2-methoxyethoxy]-ethanol were distilled under reduced pressure to give 332 g of crude product as a wet white solid. Redissolved 256 g of this material in toluene (1000 ml) and extracted it with 3 times 200 ml of a 7.5% potassium bicarbonate solution followed by one extraction with 200 ml of water. Dried the organic phase with anhydrous magnesium sulfate overnight. After removing the magnesium sulfate by filtratin, toluene was removed by distillation to give 45 g of a yellow liquid product. Overall yield is 17%. Calcd. % Br, 46.6. Found % Br, 45.7. Analytical data is consistent with the assigned structure.

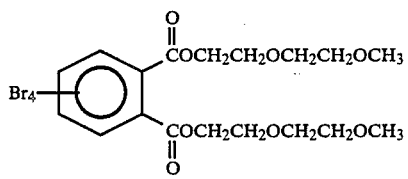

EXAMPLE 44

This compound was prepared by the procedure outlined in Example 43 except that 2-[2-methoxyethoxy]-ethanol.

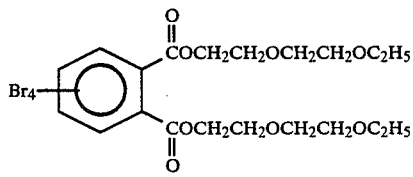

EXAMPLE 45

This compound was prepared by the procedure outlined in Example 1 except that docosyl alcohol (behenyl alcohol) was used in place of poly(ethylene glycol 600) and propylene oxide in place of ethylene oxide. Product is a viscous liquid. Calcd. % Br, 37.7. Found % Br, 36.5. Analytical data is consistent with the assigned structure.

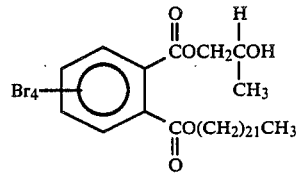

EXAMPLE 46

This compound was prepared by the procedure outlined in Example 1 except that tricontyl alcohol was used in place of poly(ethylene glycol 600) and propylene oxide in place of ethylene oxide. Product is a viscous liquid.

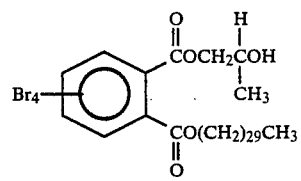

EXAMPLE 47

This compound was prepared by the procedure outlined in Example 4 except that methoxycarbowax 550 was used in place of 2-[2-methoxyethoxy]-ethanol.

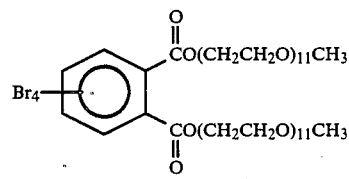

EXAMPLE 48-51

In the following examples, the flame retardancy of the compounds of this invention are demonstrated. The compositions were prepared by mixing together the flame retardants, antimony oxide, and ABS on a roller until the compounds were blended thoroughly. The compounds were pelletized at 230°-245° C. and then injection molded into test specimens at 230° C. The UL-94 vertical burn test was run and compared to a control consisting of ABS itself. ABS=Acrylonitril-styrene-butadiene terpolymer DTBPE=1,2-bis(2,4,5-tribromophenoxy)-ethane (70% Bromine) DOTBP=Dioctyl tetrabromophthalate (45% Bromine) AO=Antimony Oxide

TABLE I

| | Example No. | | | |
|---|---|---|---|---|
| | 48 | 49 | 50 | 51 |
| ABS[a] | 100 | 100 | 100 | 100 |
| DTBPE | — | 22 | 11 | 5.5 |
| DOTBP | — | — | 17 | 25.7 |
| AO | — | 4 | 4 | 4 |
| UL-94 @ 0.125" | Failed | V-0 | V-0 | V-0 |
| @ 0.062" | Failed | V-1 | V-1 | V-1 |

[a]Borg-Warner's Cycola ® T

The above clearly demonstrates the flame retardancy of the compositions of this invention relative to the control. These compositions have at least equivalent flame retardancy to the conventional flame retardant used in ABS (DTBPE).

EXAMPLES 52-55

Impact strength of the various materials were determined according to ASTM D256.

TABLE II

|  | Example No. | | | |
| --- | --- | --- | --- | --- |
|  | 52 | 53 | 54 | 55 |
| ABS[a] | 100 | 100 | 100 | 100 |
| DTBPE | — | 22 | 11 | 5.5 |
| DOTBP | — | — | 17 | 25.7 |
| AO | — | 4 | 4 | 4 |
| NOTCHED IZOD IMPACT (ft-lb/in notch) | 3.34 | 1.26 | 1.98 | 1.66 |

[a]Borg-Warner's Cycolac ® T

As can be seen from the data above, the conventional flame retardant, DTBPE, greatly reduces the impact strength of ABS compared to those examples where a portion of the DTBPE is replaced by the flame retardants of this invention.

EXAMPLES 56-58

Heat Deflection Temperature (HDT) of the various materials were determined according to ASTM D648.

TABLE III

|  | Example No. | | |
| --- | --- | --- | --- |
|  | 56 | 57 | 58 |
| ABS[a] | 100 | 100 | 100 |
| DTBPE | — | 22 | 11 |
| DOTBP | — | — | 17 |
| AO | — | 4 | 4 |
| HEAT DEFLECTION TEMP. (HDT) @ 264 psi (°F.) | 182 | 167 | 166 |

[a]Borg-Warner's Cycolac ® T

The data above shows that there is negligible charge in HDT when a portion of the conventional flame retardant, DTBPE, is replaced by the materials of this invention.

We claim:
1. A flame retardant composition comprising
   (i) an ABS terpolymer resin; and
   (ii) a flame retarding effective amount of a flame retardant processing aid of the formula:

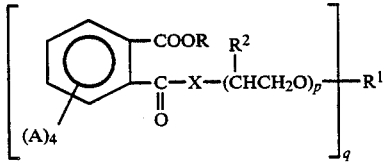

wherein:
(a) R is selected from the group consisting of hydrogen, an alkyl or substituted alkyl of 1 to 9 carbons, hydroxyalkyl of 2 to 30 carbons; and

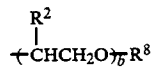

where $R^8$ is an alkyl or substituted alkyl of 1 to 8 carbons, and b is 1 to 50;

(b) $R^1$ is selected from the group consisting of hydrogen, an alkyl or substituted alkyl of 1 to 9 carbons, alkenyl or substituted alkenyl of 2 to 22 carbons,

where $R^7$ is an alkyl of 1 to 18 carbons, a polyhydroxyalkyl of 3 to 12 carbons;

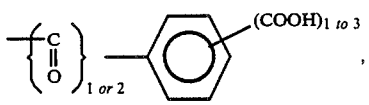

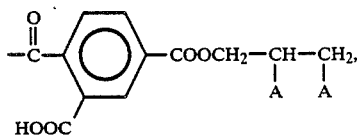

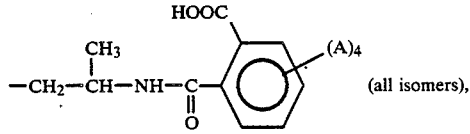

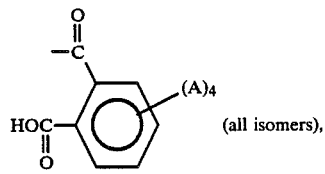

$$-\overset{R^3}{\underset{|}{C}}H\overset{R^4}{\underset{|}{C}}HNR^5R^6, \quad -(\overset{R^3}{\underset{|}{C}}H\overset{R^4}{\underset{|}{C}}H)_2NR^5, \text{ and } -(\overset{R^3}{\underset{|}{C}}H\overset{R^4}{\underset{|}{C}}H)_3N;$$

(c) $R^2$ is independently selected from the class consisting of H and $CH_3$;
(d) $R^3$, $R^4$, $R^5$, and $R^6$ are independently selected from the class consisting of H and an alkyl of 1 to 18 carbons;
(e) p is an integer of 0 to 50;
(f) q is an integer of 1 to 6;
(g) X is selected from O or NH; and
(h) A is selected from Cl or Br.

2. The composition of claim 1 wherein the ration of (i) to (ii) is within the range of about 100:1 to about 2:1.

3. The composition of claim 1 wherein in said ABS resin a portion or all of the acrylic monomers are replaced with methacrylonitrile and a portion or all of the styrenic monomers are replaced with α-methylstyrene.

4. The composition of claim 1 wherein said flame retardant processing aid ester of (ii) R is an alkyl or substituted alkyl of 1 to 9 carbons, A is Br, X is oxygen, p is 0 to 20, and q is 1 to 6.

5. The composition of claim 4 wherein R is alkyl of 1 to 9 carbons, A is Br, X is oxygen, p is 0 to 20, and q is 1 to 6.

6. The composition of any one of claims 1, 2, 3, 4 or 5 containing other brominated or chlorinated flame retardants or other brominated and chlorinated flame retardants.

7. The composition of claim 6 wherein said other brominated flame retardants are selected from the group consisting of

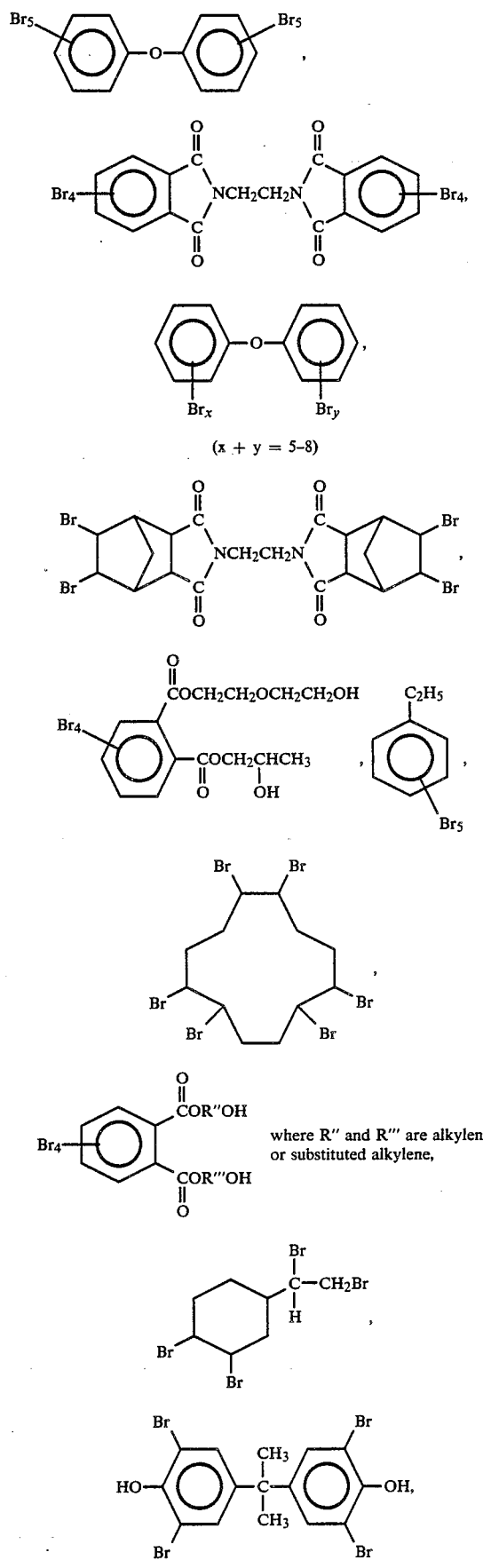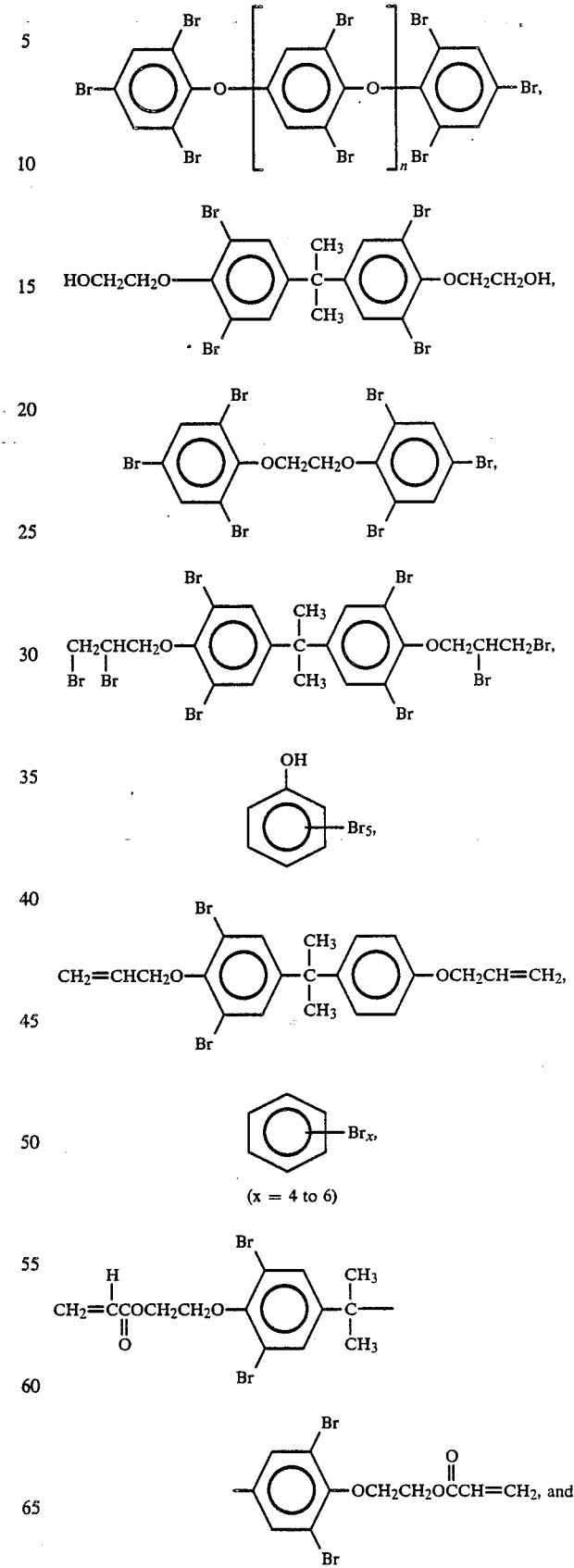

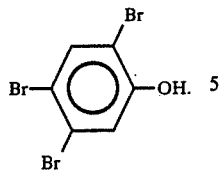

8. The composition as claimed in any one of claims, 1, 2, 3, 4, or 5 wherein said ABS resin is comprised of monomeric units of a vinyl aromatic monomer, a vinyl nitrile monomer, and a butadiene monomer and the number of units of each monomer is independently within the range of from about 10 to about 1500.

9. A method for preparing a flame retardant composition having enhanced processability properties which comprises incorporating a flame retarding effective amount of the flame retardant processing aid of claim 1(ii) in the ABS resin of claim 1(i).

10. The method of claim 9 wherein the weight ratio of the ABS resin to the flame retardant processing aid is within the range of 100:1 to 2:1.

11. The method of claim 9 wherein said resin of claim 1(i) a portion or all of the acrylic monomers are replaced with methacrylonitrile and a portion or all of the styrenic monomers are replaced with α-methylstyrene.

12. The method of claim 10 wherein in said flame retardant processing aid ester of claim 1(ii) R is an alkyl or substituted alkyl of 1 to 10 carbons, A is Br, X is oxygen, p is 0 to 20, and q is 1 to 6.

13. The method of claim 9 wherein R is

—CH$_2$CH(CH$_3$)—OH, —CH$_3$, —C$_2$H$_5$, —C$_3$H$_7$, —C$_6$H$_{13}$, —C$_4$H$_9$

—C$_8$H$_{17}$  —CH$_2$CH(C$_2$H$_5$)C$_4$H$_9$,   R$^1$ is CH$_3$, C$_2$H$_5$, C$_4$H$_9$, H, —C$_3$H$_7$,

—C$_6$H$_{13}$, —C$_8$H$_{17}$, —CH$_2$CH(C$_2$H$_5$)C$_4$H$_9$, —C$_{10}$H$_{21}$, or

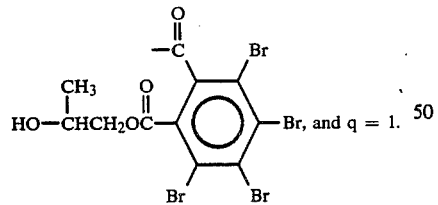

Br, and q = 1.

14. The method of claim 9 wherein the resin of claim 1(ii) includes other brominated or chlorinated flame retardants or other brominated and chlorinated flame retardants.

15. The method of claim 14 wherein said brominated flame retardants are selected from the group consisting of

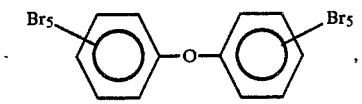

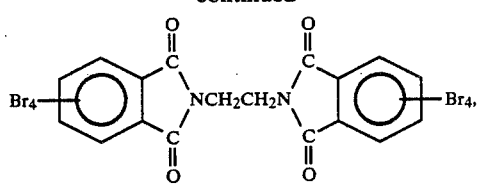

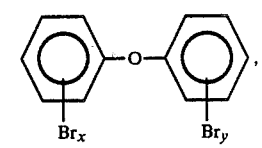

(x + y = 5-8)

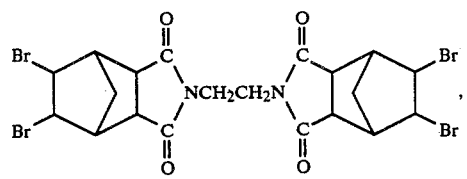

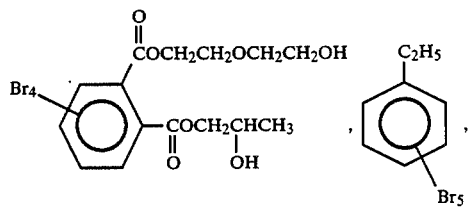

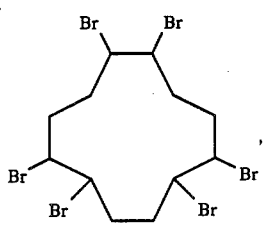

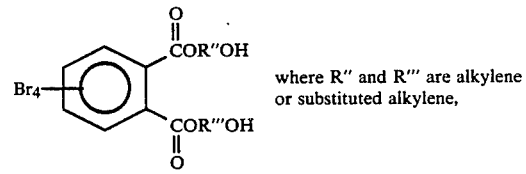

where R″ and R‴ are alkylene or substituted alkylene,

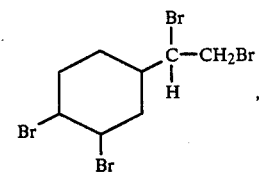

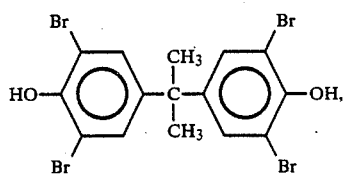

-continued
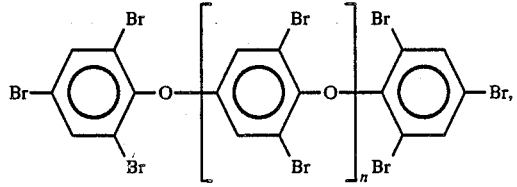
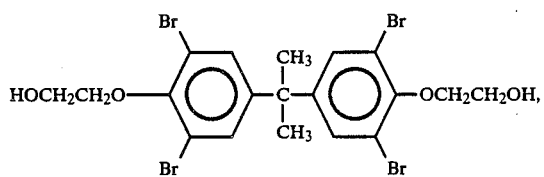
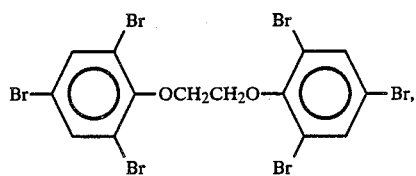
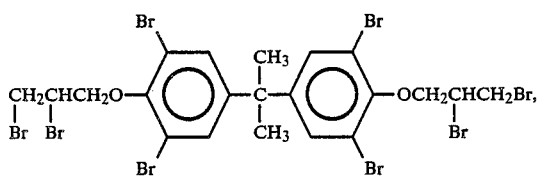
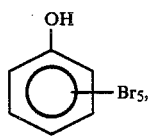
-continued
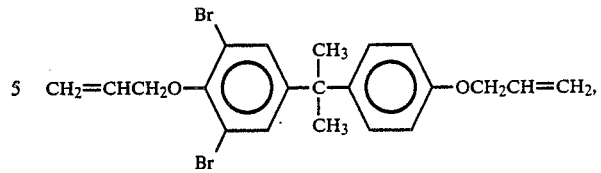
(x = 4 to 6)
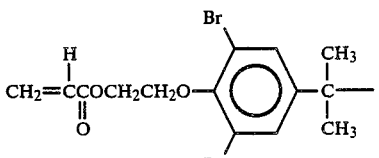
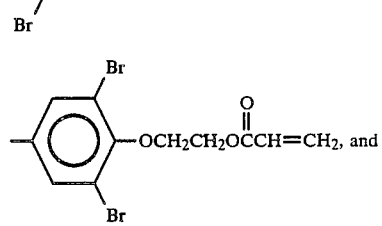
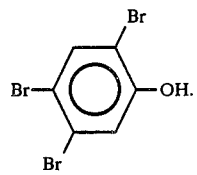
16. The method of any one of claims 9, 10, 11, 12, 13, 14, or 15 wherein said ABS resin is comprised of monomeric units of a vinyl aromatic monomer, a vinyl nitrile monomer, and a butadiene monomer and the number of units of each monomer is independently within the range of from about 10 to about 1500.
* * * * *